United States Patent
Kaneko (10) Patent No.: US 6,839,621 B2
(45) Date of Patent: Jan. 4, 2005

(54) STOP-START CONTROL APPARATUS OF INTERNAL COMBUSTION ENGINE, AND CONTROL METHOD THEREOF

(75) Inventor: Tomohiro Kaneko, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/487,402

(22) PCT Filed: Aug. 27, 2002

(86) PCT No.: PCT/IB02/03450

§ 371 (c)(1),
(2), (4) Date: Feb. 23, 2004

(87) PCT Pub. No.: WO03/018980

PCT Pub. Date: Mar. 6, 2003

(65) Prior Publication Data

US 2004/0214689 A1 Oct. 28, 2004

(30) Foreign Application Priority Data

Aug. 28, 2001 (JP) ........................................ 2001-258584

(51) Int. Cl.$^7$ ................................................ F02D 25/00
(52) U.S. Cl. ................................. 701/112; 123/179.4
(58) Field of Search ......................... 701/112; 123/179.4

(56) References Cited

U.S. PATENT DOCUMENTS 5,447,143 A    9/1995   Ott et al. ..................... 123/612

2003/0041830 A1 *  3/2003   Sugiura et al. .......... 123/179.4
2004/0149246 A1 *  8/2004   Itoh et al. ................ 123/179.4

FOREIGN PATENT DOCUMENTS

| EP | 0 990 793 A2 | 4/2000 |
|---|---|---|
| EP | 1 036 694 A2 | 9/2000 |
| EP | 1 077 149 A2 | 2/2001 |
| JP | A 11-278091 | 10/1999 |
| JP | A 11-324755 | 11/1999 |
| WO | WO 01/42638 A1 | 6/2001 |

* cited by examiner

*Primary Examiner*—Hieu T. Vo
(74) *Attorney, Agent, or Firm*—Oliff & Berridge, PLC

(57) ABSTRACT

In an eco-run control, determination of a stop of an internal combustion engine (1) is reliably and promptly made. An internal combustion engine stop-start control apparatus for executing a control of stopping the internal combustion engine (1) upon satisfaction of a predetermined stop condition, and for executing a control of starting the internal combustion engine (1) upon satisfaction of a predetermined start condition, has: stop request determination means (step S1) for determining that there is a request for stopping the internal combustion engine (1) based on satisfaction of the stop condition; and stop determination means (steps S2, S4) for determining a stop of the internal combustion engine (1) based on a state of a predetermined physical quantity that changes in relation to operation of the internal combustion engine (1), the state occurring within a predetermined determination time (Ten), and for setting the determination time (Ten) shorter if the request for stopping the internal combustion engine (1) is present than if the request is absent.

15 Claims, 4 Drawing Sheets

STOP-START CONTROL APPARATUS OF INTERNAL COMBUSTION ENGINE, AND CONTROL METHOD THEREOF

BACKGROUND OF THE INVENTION

1. Field of the Invention

The invention relates to a control apparatus for automatically stopping or starting an internal combustion engine, such as a gasoline engine, a diesel engine, or the like, upon satisfaction of a predetermined condition. More particularly, the invention relates to a control apparatus for making a determination regarding a stop of an internal combustion engine, and a control method of the apparatus.

2. Description of the Related Art

An internal combustion engine installed in a vehicle is stopped not only due to an intentional stop operation, but also due to a fuel shortage, an excessive drop in engine rotation speed, etc. Lately, an internal combustion engine is also stopped by a generally termed eco-run control of stopping the engine at a stop of the vehicle for the purpose of improving fuel economy. A technology in which an engine is stopped by the eco-run control is described in Japanese Patent Application Laid-Open No. 11-324755. According to the technology described in this laid-open patent application, at the time of an automatic run of the engine caused upon satisfaction of a predetermined condition, the standby time prior to execution of the automatic engine stop is changed in length in accordance with the magnitude of the braking operation force occurring during the state in which the condition is satisfied.

If the engine is stopped due to an automatic stop based on a generally termed stop control, or due to other causes, various controls associated with the stop are usually performed. Furthermore, as described in the aforementioned patent application, in the eco-run control, the engine is restarted when the satisfaction of the condition discontinues. Therefore, the determination regarding a stop of the engine needs to be performed electrically or mechanically.

Many conventional internal combustion engines employ a sensor that outputs a pulse signal at every predetermined rotational angle of an output shaft, for example, a crankshaft or the like, as a device for detecting the engine rotation speed. In this kind of internal combustion engine, the use of the sensor makes it possible to determine whether the engine has stopped. That is, if the engine rotation speed decreases, the pulse signal interval or the pulse width becomes long, and the duration from the time point of input of the previous signal to the time point of input of the next signal (generally termed update time) becomes long. If the engine stops, the pulse signal is no longer updated. Therefore, an engine stop can be determined at a time point at which the elapsed time from the previous signal update reaches a predetermined length of time.

[Problems To be Solved]

As described above, the engine stops for various factors. The behavior of engine operation occurring until the engine rotation stops varies from one stop factor to another. For example, if the engine comes to a stall due to an abnormality or a trouble, the change in engine rotation speed is not monotonous, but the engine rotation speed changes in a generally termed oscillating manner in which the rotation speed repeats increases and decreases until the engine finally stops. In this case, even if the pulse signal update time increases with the decreasing engine rotation speed during the process from the start of decrease in rotation speed until a stop of the engine, it is impossible to immediately determine whether the increased update time is a result of a stop of the engine or is merely an increased update time preceding a stop.

Therefore, the time allowed before determining a stop of the engine is set long in order to ensure reliable determination of a stop of the engine regardless of the kind of stop factor. That is, determination of a stop of the engine is made if a predetermined stop determination time elapses without update of the pulse signal.

In the aforementioned eco-run control, the engine stop control is performed upon satisfaction of a predetermined stop condition. If after that, a vehicle start request is made, the satisfaction of the predetermined stop condition discontinues and the engine restart control is to be performed. In that case, the engine restart control is executed only after a stop of the engine is determined. Therefore, the restart of the engine delays if there is a delay in determination of a stop of the engine.

Therefore, according to the engine stop determination and the subsequent engine restart control in the conventional art, a long time is needed prior to actual restart of the engine if a start request is made immediately after the engine stop condition is met in the generally termed eco-run control. Hence, various drawbacks occur. For example, a response delay in the start control causes discomfort, or causes laggardness.

SUMMARY OF THE INVENTION

The invention has been accomplished in view of the aforementioned technical problems. It is an object of the invention to improve the restart performance of an internal combustion engine by promptly and reliably determining a stop of the engine when the engine is to be restarted after being automatically stopped.

In order to achieve the aforementioned object, a first aspect of the invention provides a vehicle-installed internal combustion engine stop-start control apparatus that executes a control of stopping an internal combustion engine upon satisfaction of a predetermined stop condition, and that executes a control of starting the internal combustion engine upon satisfaction of a predetermined start condition. The control apparatus includes: stop request determination means for determining that there is a request for stopping the internal combustion engine based on satisfaction of the stop condition; and stop determination means for determining a stop of the internal combustion engine based on a state of a predetermined physical quantity that changes in relation to operation of the internal combustion engine, the state occurring within a predetermined determination time, and for, if the request for stopping the internal combustion engine is present, setting the determination time at a time that is shorter than a determination time set if the request is absent.

In another construction, the stop determination means determines a stop of the internal combustion engine (1) based on elapse of a predetermined time from a predetermined time point which relates to operation of the internal combustion engine if the internal combustion engine is stopped based on a request for stopping the internal combustion engine.

Furthermore, in a control method of the above-described control apparatus, it is determined that there is a request for stopping the internal combustion engine based on satisfaction of the stop condition. If the request for stopping the internal combustion engine (1) is present, the determination time for determining a stop of the internal combustion engine is set at a time that is shorter than a determination time set if the request is absent. It is determined that the internal combustion engine has stopped, based on a state of a predetermined physical quantity that changes in relation to operation of the internal combustion engine, the state occurring within the determination time.

In another control method, a stop of the internal combustion engine is determined based on elapse of a predetermined time from a predetermined time point if the internal combustion engine is stopped based on a request for stopping the internal combustion engine.

The above-described control apparatuses and methods determine that there is a request for stopping the internal combustion engine, if the predetermined condition for stopping the internal combustion engine is met. A state of a suitable physical quantity associated with operation of the internal combustion engine, such as the number of rotations, the rate of change in the number of rotations, etc., the state occurring within a predetermined determination time, is determined. A stop of the internal combustion engine is determined based on the aforementioned state. The determination time differs between the case where the engine stop request is made and the case where stop request is not made. Specifically, the determination time is reduced in the case where the engine stop request is made, in comparison with the other case. As a result, if the engine stop request is made upon satisfaction of the predetermined condition, determination of a stop of the engine is made within a short time. Therefore, even in a case where after the engine stop control is initiated upon satisfaction of the predetermined condition, the engine is started due to discontinuation of the satisfaction of the condition, the stop of the engine is determined at an early time, so that the engine start control is executed at an early time. Therefore, it becomes possible to avoid generally-termed laggardness or the like.

BRIEF DESCRIPTION OF THE DRAWINGS

FIG. 2 is a graph indicating changes in engine rotation speed toward a stop of the engine, in the case of an automatic stop and in the case of a stop caused by an abnormality or the like.

DETAILED DESCRIPTION OF PREFERRED EMBODIMENTS

Figure 5:
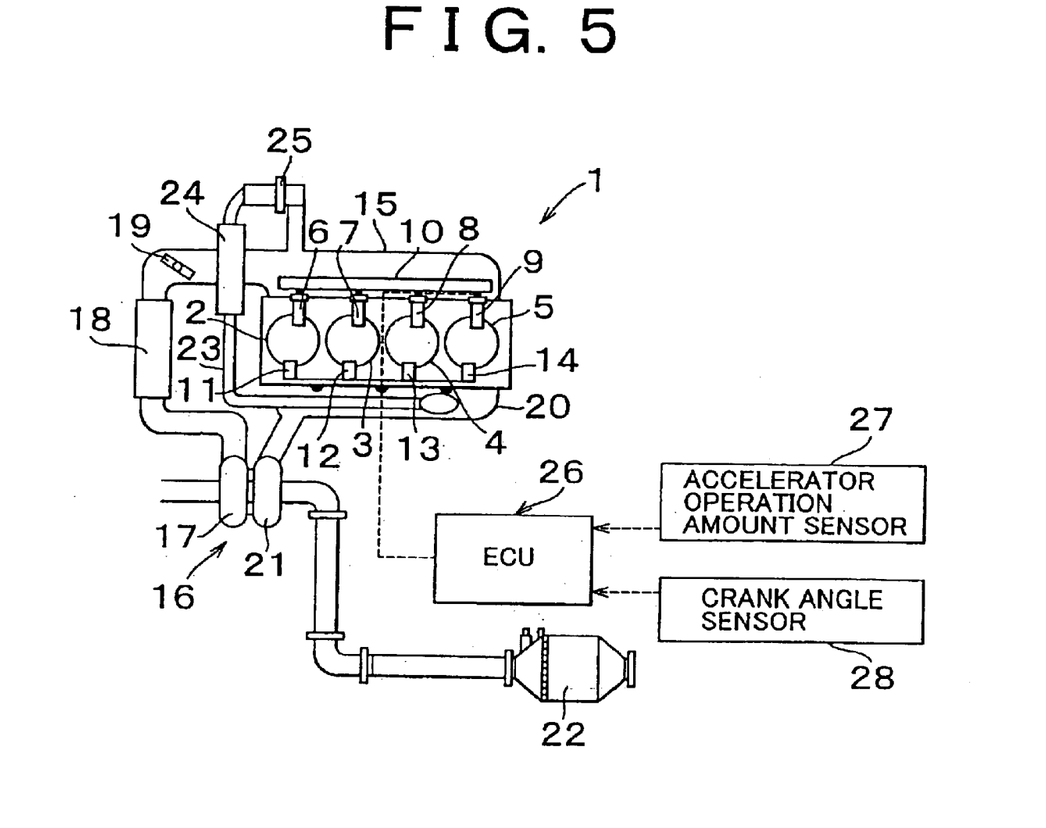
FIG. 5 is a schematic block diagram of a control system of an internal combustion engine to which the invention pertains.

Preferred embodiments of the invention will be described below. Firstly, an internal combustion engine to which the invention pertains will be described. The internal combustion engine in accordance with the invention is an internal combustion engine that can be automatically stopped and automatically restarted by supplying fuel or air to the engine and stopping the supply thereof, or by performing and stopping the fuel ignition. Examples of the engine include diesel engines, gasoline engines, engines that use a gas as a fuel, etc. FIG. 5 shows a diesel engine as an example of an internal combustion engine (engine) 1. The engine 1 is a generally termed direct injection-type engine in which fuel is injected directly into cylinders 2, 3, 4, 5. The engine 1 is equipped with an exhaust gas recirculating mechanism (EGR) for exhaust emission control.

That is, each cylinder 2, 3, 4, 5 is provided with an injector 6, 7, 8, 9 that injects fuel at high pressure. These injectors 6, 7, 8, 9 are connected to a common rail 10 that pressurizes fuel and therefore supplies high-pressure fuel. Each cylinder 2, 3, 4, 5 is provided with a glow plug 11, 12, 13, 14.

An intake manifold 15 that distributes intake air to the cylinders 2, 3, 4, 5 is connected to a compressor 17 of an exhaust-type supercharger 16. An intake passage extending from the compressor 17 to the intake manifold 15 is provided with an intercooler 18 for cooling the intake air heated by pressurization, and an intake throttle valve 19 for controlling the amount of intake. The intake throttle valve 19 is designed so that the valve 19 can be electrically controlled by an actuator (not shown) such as an electric motor or the like.

An exhaust manifold 20 connected to exhaust ports of the cylinders 2, 3, 4, 5 is connected to an exhaust turbine 21 of the exhaust-type supercharger 16. The exhaust turbine 21 is connected in communication to a catalytic converter 22 that has an emission control catalyst.

An exhaust gas recirculation passage 23 is provided for conducting a portion of the combustion exhaust gas produced in the cylinders 2, 3, 4, 5 to the intake manifold 15. The exhaust gas recirculation passage 23 is provided with an EGR cooler 24 for cooling exhaust gas and an EGR valve 25 for controlling the amount of flow of exhaust gas, in that order from the side of the exhaust manifold 20.

The above-described engine 1 is designed so as to allow a generally termed eco-run control in which the engine is automatically stopped upon satisfaction of a predetermined condition, for example, a condition that the vehicle is at a stop and a braking operation is performed, and the engine is automatically restarted upon discontinuation of the satisfaction of the stop condition, for example, discontinuation of the braking operation. For this control, an electronic control unit (ECU) 26 is provided.

The electronic control unit 26 is formed mainly by a microcomputer. The engine electronic control unit 26 is designed so as to perform computation based on input data, and to execute a control for stopping the engine 1 and a control for restarting the engine 1 based on results of computation. The control for stopping the engine 1 is, for example, a control that closes the intake throttle valve 19 and the EGR valve 25, and stopping fuel injection. The control for restarting the engine 1 is, for example, a control that opens the intake throttle valve 19, and cranks the engine 1 by driving a starter (not shown), and injects fuel in accordance with the cranking of the engine 1.

In order to perform these controls, an accelerator operation amount sensor 27 and a crank angle sensor 28 are connected to the electronic control unit 26. Although not indicated in the drawings, signals indicating other physical quantities, such as vehicle speed signals and the like, are input to the electronic control unit 26.

Figure 6:
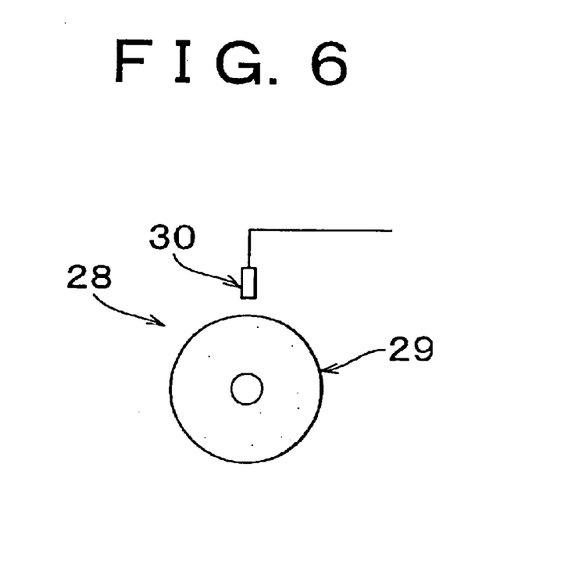
FIG. 6 is a schematic illustration of a crank angle sensor.

The crank angle sensor 28 is a sensor for detecting the crank angle in order to determine a cylinder where fuel injection is to be performed. As shown in FIG. 6, the crank angle sensor 28 has an angle plate 29 mounted on an output shaft of the engine 1, and a pickup 30 disposed at a predetermined position radially outward of the angle plate 29. The angle plate 29 is a disc-shaped or gear-shaped member that has, on its outer peripheral edge, protrusions or teeth formed at every predetermined angle (e.g., every 10 degrees). The pickup 30 is a generally termed electromagnetic pickup that is designed so as to output a signal every time a protrusion or tooth of the angle plate 29 approaches and moves apart from the pickup. The signal output from the pickup 30 is processed into a pulse signal by the electronic control unit 26. The electronic control unit 26 is designed so as to detecting a crank angle or detecting the number of rotations of the engine 1 or the rotation speed thereof, by counting (or updating) the pulse signals.

Examples of the aforementioned physical quantity that changes with operation of the engine 1 are the rotational angle of the engine 1 and the state of the pulse signal occurring within a predetermined time. On the basis of such a physical quantity, it is determined whether the engine 1 has stopped. The determination regarding an engine stop is performed in different manners for a case where there is a request for a stop of the engine 1 in the generally termed eco-run, and a case where the engine stop request is not present.

Figure 1:
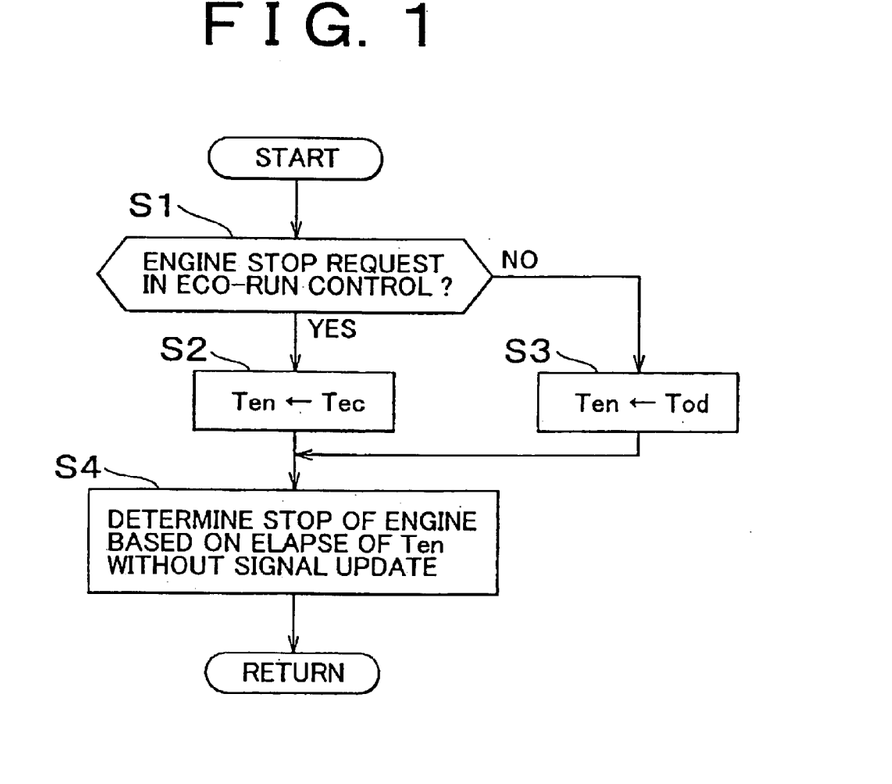
FIG. 1 is a flowchart illustrating a control performed by a control apparatus in accordance with the invention.

FIG. 1 is a flowchart illustrating an example of the aforementioned stop determining control. Firstly in this control, it is determined whether there is an engine stop request in the eco-run control (step S1). The eco-run control includes a control that stops the engine 1 by stopping the supply of fuel to the engine 1 so as to improve fuel economy, upon satisfaction of a predetermined stop condition, such as a condition that the vehicle is at a stop and the braking of the vehicle is executed with a brake pedal depressed, or the like. In step S1, it is determined whether a request for a stop of the engine 1 is output by the electronic control unit 26 in association with satisfaction of the aforementioned stop condition.

If the engine stop request in the eco-run control is present and therefore determination is affirmatively made in step S1, an eco-run control time Tec is adopted as a predetermined time Ten for determining a stop of the engine 1 (engine stall determination time) (step S2). Conversely, if the engine stop request in the eco-run control is not present and therefore determination is negatively made in step S1, a normal time Tod is adopted as a predetermined time Ten for determining a stop of the engine 1 (engine stall determination time) (step S3).

The engine stall determination time Ten is a time that elapses from attainment of predetermined state of the aforementioned physical quantity to determination of an engine stall. More specifically, the engine stall determination time Ten is a time that elapses without update of the pulse signal by the crank angle sensor 28, or a time corresponding to the pulse width of the pulse signal.

The eco-run control determination time Tec is set shorter than the normal determination time Tod. The reason for this setting is stated below.

Figure 2:
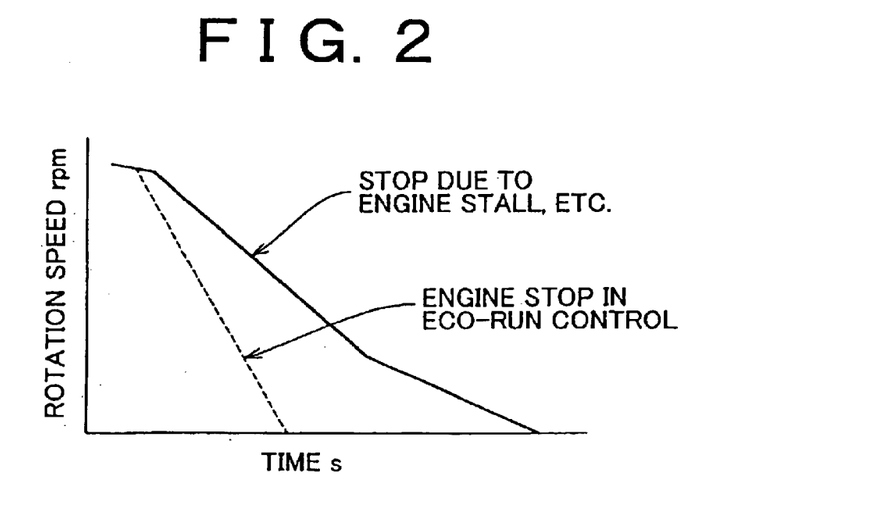

FIG. 2 is a diagram schematically indicating changes in the rotation speed of the engine 1 preceding a stop of the engine 1. In FIG. 2, a broken line indicates a case where the engine 1 is stopped by the eco-run control, and a solid line indicates a case where the engine 1 is stopped due to an abnormality, such as a fuel shortage or the like. In the case of a stop the engine 1 due to the eco-run control, satisfaction of a predetermined condition, such as a condition that the vehicle is at a stop and a braking operation is performed, or the like, triggers execution of a control of closing the intake throttle valve 19 and then stopping fuel injection, so that the rotation speed of the engine 1 decreases at a substantially constant rate (i.e., linearly). In contrast, in the case of an engine stall based on an abnormality, intake is still provided and fuel injection is performed, so that the engine rotation speed does not stably decrease (i.e., linearly) but the degreasing tendency of rotation speed changes during the decrease in some cases.

Thus, as for the stop of the engine 1 caused by the eco-run control, the engine 1 unfailingly stops at the elapse of a predetermined time. That predetermined time or a time determined on the basis of the characteristic of the stop caused by the eco-run control (that the rotation speed decreases at a substantially constant rate) is set as a determination time Tec. Although the determination time Tec is shorter than the normal determination time Tod, a stop of the engine 1 can be determined without an error.

After the engine stall determination time Ten is set as Tec or Ten in step S2 or S3, an engine stop is determined (step S4) if the output signal of the crank angle sensor 28 (or the aforementioned pulse signal) is not updated despite elapse of the determination time Tec or Tod. Therefore, in the case where the engine 1 is stopped by the eco-run control, a stop of the engine 1 can be determined without a delay because the determination time Tec is relatively short.

Figure 3:
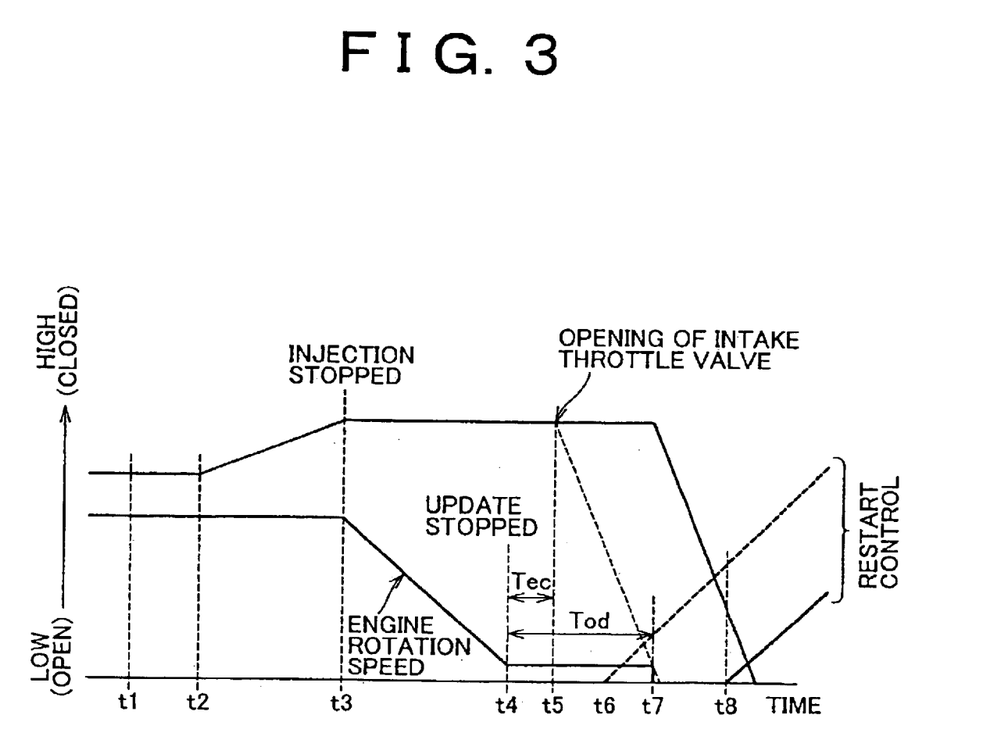
FIG. 3 is a time chart indicating state changes in a case where the control illustrated in FIG. 1 is performed, together with state changes in the case of a conventional art.

FIG. 3 is a time chart from a stop to a restart of the engine. Regarding the restart control indicated in a latter half of the chart, a control in accordance with the invention is indicated by a broken line, and a control in accordance with the conventional art is indicated by a solid line. In the chart, a fine line indicates the degree of opening of the intake throttle valve, and a bold line indicates the engine rotation speed. As for the vertical axis of the chart, upper points along the axis indicate higher engine rotation speeds and less degrees of opening of the intake throttle valve. If the engine stop request based on the eco-run control is output at a time point t1, the engine stop control is correspondingly initiated at a time point t2. Specifically, the intake throttle valve 19 is operated toward the constriction side, that is, the degree of opening of the valve is reduced. At a time point t3 when the intake throttle valve 19 becomes substantially completely closed, the fuel injection is stopped, so that the engine rotation speed begins to decrease.

After that, at a time point t4, the update of the signal from the crank angle sensor 28 or the update of a pulse signal based on the signal from the crank angle sensor 28 stops. In the control apparatus of the invention, it is determined that the engine 1 has stopped, on condition that the aforementioned signal update does not occur within a period of from the time point t4 to a time point t5 that comes at the elapse of the determination time Tec from the time point t4. In the invention, this determination (that the engine 1 has stopped) is made at the time point t5, the engine 1 can be restarted immediately after the time point t5. Therefore, as the engine restart control is initiated immediately after t5, the degree of opening of the intake throttle valve begins to increase from the substantially completely closed state. At a time point t6, the engine 1 starts to turn. Then, the rotation speed of the engine 1 begins to increase.

Therefore, according to the control apparatus of the invention, if the engine restart request is made at the time point of determination of a stop of the engine 1 or immediately after the time point, the control for restarting the engine 1 can be initiated immediately after the time point t5 of determination of the stop of the engine 1.

In the conventional art, in contrast, the determination regarding a stop of the engine during the eco-run control and the determination regarding a stop of the engine during a normal operation are performed not in distinguished manners but in the same manner. Therefore, in the case of FIG. 3, the conventional art determines the stop of the engine 1 at a time point t7 that comes at the elapse of the normal determination time Tod, which is longer than the eco-run control-purpose determination time Tec, from the time point t4. Therefore, the restart of the engine 1 is not performed until a late time point t8.

Thus, in the case of stopping the engine 1 based on the eco-run control, the control apparatus of the invention determines the stop of the engine 1 without a delay. Therefore, even if the engine restart request is made immediately after satisfaction of a condition for automatically stopping the engine 1, the control apparatus is able to avoid or reduce the delay in initiating the engine restart control. As a result, the control apparatus of the invention achieves good responsiveness in the control of automatically stopping and automatically starting the engine 1, and therefore is able to prevent discomfort, such as laggardness in vehicle behavior, or the like.

Another embodiment of the invention will be described. In the case of an engine automatic stop control in which, for example, the degree of opening of the intake throttle valve 19 is reduced and the fuel injection is stopped, the rotation speed of the engine 1 linearly decreases as indicated in FIG. 2. Since the automatic stop control of the engine 1 is initiated during an idling state of the engine 1, the engine rotation speed starts to decrease from an idling rotation speed during the automatic stop control. Therefore, the engine 1 substantially reliably stops at a predetermined time after the initiation of the automatic stop control. Hence, it is possible to determine a stop of the engine 1 based only on elapse of time, without factoring in changes in a physical quantity associated with operation of the engine 1.

Figure 4:
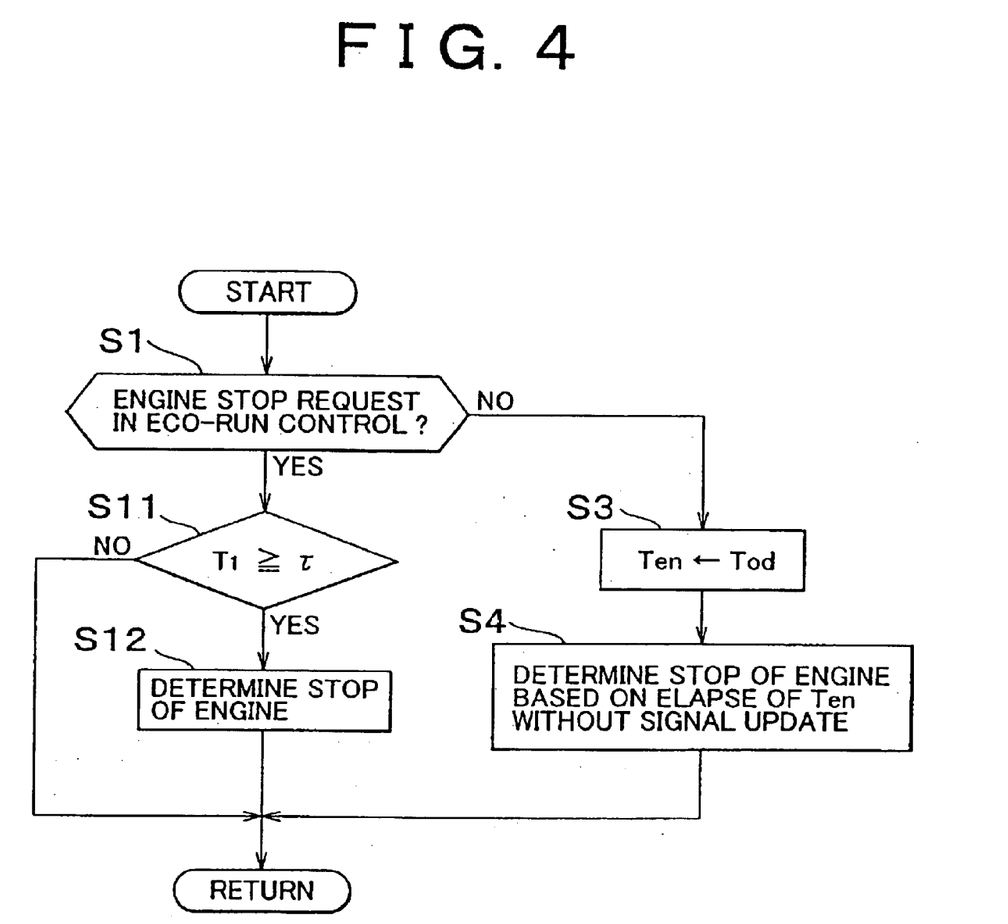
FIG. 4 is a flowchart illustrating another control performed by a control apparatus in accordance with the invention.

FIG. 4 is a flowchart illustrating a control in accordance with the embodiment. In this control, if it is determined in step S1 that there is an engine stop request based on the eco-run control, it is determined in step S11 whether the elapsed time T1 from a predetermined reference time point has reached a reference time τ. The reference time point may be, for example, a time point of output of the engine stop request based on the eco-run control, a time point of initiation of the automatic stop control of the engine 1, a time point of stop of fuel injection, etc. The reference time τ is a time set through actual measurement beforehand as a time that elapses from the reference time until stop of the engine 1. Instead of the time predetermined individually for engines, the engine 1 may be a map value set in accordance with data, such as a degrease gradient (rate of change) of engine rotation speed occurring after the fuel injection stops, or the like.

If the determination in step S11 is negatively made, the process returns to continue the existing control. If the determination in step S11 is affirmatively made, an engine stop is determined (step S12).

If the determination in step S1 is negatively made, that is, if the automatic stop of the engine 1 based on the eco-run control is not the case, the time Tec for determination of a stop of the engine 1 is set as the normal determination time Tod, as in the control process illustrated in FIG. 1. That is, a stop of the engine 1 is determined at a time point when the elapsed time from the time point of absence of the signal update reaches the normal determination time Tod (step S4).

This construction intended to execute the control illustrated in FIG. 4 is also able to reduce the time needed for determination of a stop of the engine 1 while avoiding a false determination as behavior of the engine 1 smoothly or linearly changes toward a stop of the engine during the automatic stop control of the engine 1. As a result, the automatic stop of the engine 1 and the immediately subsequent restart of the engine 1 during the generally termed eco-run control can be smoothly executed without a considerably delay time. Thus, it is possible to prevent discomfort, such as laggardness associated with a delay in engine startup, or the like.

The relationships between the foregoing embodiments and the invention will be briefly described below. The functional means of step S1 illustrated in FIGS. 1 and 4 correspond to the stop request determination means in the invention. The functional means of steps S2 and S4 in FIG. 1 correspond to the stop determination means. The functional means of steps S11 and S12 in FIG. 4 correspond to the stop determination means.

The invention is not limited to the foregoing embodiments. For example, if the fuel injection is stopped by the engine stop control, the stop determination may be performed based on the crankshaft rotation speed integrated value acquired with reference to the final fuel injection as the initiation point of integration. That is, if the number of rotation of the crankshaft (i.e., integrated value of rotation angle) occurring from the last injection to the stop of rotation of the crankshaft is less than or equal to a predetermined number of rotations, it is determined that the engine stop is a stop based on the eco-run control. If the number of rotation of the crankshaft occurring from the last injection to the stop of rotation of the crankshaft is greater than the predetermined number of rotations, it is determined that the engine 1 is not a stop based on the eco-run control, but is a stop caused by engine stall or the like.

The physical quantity that changes in association with operation of the internal combustion engine in the invention is not limited to the pulse signal generated in relation to the rotation of the crankshaft, but may also be a physical quantity that changes in relation to the piston position of the internal combustion engine, changes in an image in relation to operation of an operating member of the internal combustion engine, etc.

[Advantage of the Invention]

As is apparent from the foregoing description, in the case of an automatic stop of an internal combustion engine upon satisfaction of a predetermined condition, the control in accordance with the invention determines a state of a suitable physical quantity related to operation of the internal combustion engine, such as the number of rotations (or rotation speed), the rate of change thereof, etc., the state occurring within a predetermined determination time. The control determines whether the engine has stopped based on the state of the physical quantity. The determination time is reduced in the case where an engine stop request is made, in comparison with the other cases. As a result, if an engine stop request is output upon satisfaction of a predetermined condition, a stop of the engine is determined within a reduced time. Therefore, even in a case where after the engine stop control is initiated subsequently to the satisfaction of the predetermined condition, the satisfaction of the predetermined condition discontinues and the engine is to be restarted, the engine start control is executed early due to the early determination of the stop of the engine. Thus, the control of the invention is able to avoid generally-termed laggardness.

Furthermore, if the predetermined condition for stopping the internal combustion engine is met, a request for stopping the engine is made, and the engine stop control is executed upon the stop request. Therefore, behavior of the internal combustion engine changes toward a stop, and the change is fixed depending on the type of internal combustion engine, the content of the stop control, etc. Then, the stop of the internal combustion engine is determined based on the elapse of a predetermined time set in accordance with the behavior change toward the stop. The predetermined time does not include a holding time for an uncertain state that occurs in the case where the internal combustion engine stops due to an abnormality. Therefore, the predetermined time can be set relatively short. Hence, it becomes possible to determine a stop of the engine at an early stage.

Still further advantages are achieved. That is, if upon a stop request, the rotation speed of the internal combustion engine decreases at a great rate, that is, sharply decreases, the predetermined time for determining a stop of the engine is short, so that the stop of engine can be determined at a still early stage. Therefore, the control of the invention is able to avoid or reduce the delay in determination of a stop of the engine or restart of the engine.

What is claimed is:

1. A vehicle-installed internal combustion engine stop-start control apparatus that executes a control of stopping an internal combustion engine upon satisfaction of a predetermined stop condition, and that executes a control of starting the internal combustion engine upon satisfaction of a predetermined start condition, the control apparatus, comprising:

stop request determination portion which determines that there is a request for stopping the internal combustion engine based on satisfaction of the stop condition; and stop determination portion which determines a stop of the internal combustion engine based on a state of a predetermined physical quantity that changes in relation to operation of the internal combustion engine, the state occurring within a predetermined first determination time, and for, if the request for stopping the internal combustion engine is present, setting the first determination time at a time that is shorter than a second determination time set if the request is absent.

2. The control apparatus according to claim 1, wherein the physical quantity is a rotation angle of an output shaft of the internal combustion engine.

3. The control apparatus according to claim 1, wherein the state is a state where the rotation angle of the output shaft within the first determination time is equal to, or less than a predetermined rotation angle.

4. The control apparatus according to claim 2, wherein the state is a state where the pulse signal is not outputted within the determination time.

5. The control apparatus according to claim 2, wherein the state is a state where the rotation angle of the output shaft within the determination time is equal to, or less than a predetermined rotation angle.

6. The control apparatus according to claim 1, further comprising a crank angle sensor for detecting an angle of an output shaft of the internal combustion engine, wherein the physical quantity is a pulse signal output from the crank angle sensor.

7. The control apparatus according to claim 1, wherein the state is a state where the pulse signal is not outputted within the first determination time.

8. The control apparatus according to claim 1, wherein the stop condition is a condition that a vehicle is at a stop and a brake operation of the vehicle is executed.

9. A vehicle-installed internal combustion engine stop-start control apparatus that executes a control of stopping an internal combustion engine upon satisfaction of a predetermined stop condition, and that executes a control of starting the internal combustion engine upon satisfaction of a predetermined start condition, the control apparatus, comprising:

stop request determination portion which determines that there is a request for stopping the internal combustion engine based on satisfaction of the stop condition; and stop determination portion which determines a stop of the internal combustion engine based on elapse of a predetermined time from a predetermined time point if the internal combustion engine is stopped based on a request for stopping the internal combustion engine, wherein the predetermined time is set based on data including at least a degree of decrease in a number of rotations of the internal combustion engine.

10. The control apparatus according to claim 9, wherein the predetermined time is a time that elapses until the internal combustion engine is brought to a stop from an idling state of the internal combustion engine based on satisfaction of the stop condition.

11. The control apparatus according to claim 9, wherein the predetermined time point relates to the control of stopping the internal combustion engine.

12. The control apparatus according to claim 11, wherein the predetermined time point is one of:

a time point at which the request for stopping the internal combustion engine is output, a time point at which a stop control of the internal combustion engine is started, and a time point at which fuel injection of the internal combustion engine is stopped.

13. The control apparatus according to claim 9, wherein the stop condition is a condition that a vehicle is at a stop and a brake operation of the vehicle is executed.

14. A vehicle-installed internal combustion engine stop-start control method that executes a control of stopping an internal combustion engine upon satisfaction of a predetermined stop condition, and that executes a control of starting the internal combustion engine upon satisfaction of a predetermined start condition, the control method comprising the steps of, determining that there is a request for stopping the internal combustion engine based on satisfaction of the stop condition, and determining a stop of the internal combustion engine based on a state of a predetermined physical quantity that changes in relation to operation of the internal combustion engine, the state occurring within a predetermined first determination time, and, setting the first determination time if the request for stopping the internal combustion engine is present, the first determination time is shorter than a second determination time if the request is absent.

15. A vehicle-installed internal combustion engine stop-start control method that executes a control of stopping an internal combustion engine upon satisfaction of a predetermined stop condition, and that executes a control of starting the internal combustion engine upon satisfaction of a predetermined start condition, the control method comprising the steps of,     determining that there is a request for stopping the internal combustion engine based on satisfaction of the stop condition, and     determining a stop of the internal combustion engine based on elapse of a predetermined time from a predetermined time point if the internal combustion engine is stopped based on a request for stopping the internal combustion engine,     wherein the predetermined time is set based on data including at least a degree of decrease in a number of rotations of the internal combustion engine.

\* \* \* \* \*